United States Patent
Nakano

(10) Patent No.: US 10,065,573 B2
(45) Date of Patent: Sep. 4, 2018

(54) MONITOR STOWAGE DEVICE

(71) Applicant: Panasonic Intellectual Property Management Co., Ltd., Osaka-shi, Osaka (JP)

(72) Inventor: Yoshihiko Nakano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 386 days.

(21) Appl. No.: 14/394,468

(22) PCT Filed: May 29, 2013

(86) PCT No.: PCT/JP2013/003396
§ 371 (c)(1),
(2) Date: Oct. 14, 2014

(87) PCT Pub. No.: WO2014/002379
PCT Pub. Date: Jan. 3, 2014

(65) Prior Publication Data
US 2015/0069887 A1 Mar. 12, 2015

(30) Foreign Application Priority Data
Jun. 28, 2012 (JP) .................................. 2012-145436

(51) Int. Cl.
*B60R 11/02* (2006.01)
*B64D 11/00* (2006.01)
(Continued)

(52) U.S. Cl.
CPC .......... *B60R 11/0235* (2013.01); *B63B 29/04* (2013.01); *B64D 11/0015* (2013.01);
(Continued)

(58) Field of Classification Search
CPC .. B60R 11/0235; B63B 29/04; B64D 11/0015
See application file for complete search history.

(56) References Cited

U.S. PATENT DOCUMENTS

| | | | |
|---|---|---|---|
| 5,398,991 A | 3/1995 | Smith et al. | |
| 6,168,250 B1 | 1/2001 | Rogov | |
| (Continued) | | | |

FOREIGN PATENT DOCUMENTS

| | | |
|---|---|---|
| GB | 2486569 A | 6/2012 |
| JP | H06-316240 A | 11/1994 |
| (Continued) | | |

OTHER PUBLICATIONS

The Search Report from the corresponding International Patent Application No. PCT/JP2013/003396 dated Aug. 27, 2013.

*Primary Examiner* — Shawn An
(74) *Attorney, Agent, or Firm* — Shinjyu Global IP

(57) ABSTRACT

A monitor stowage device for stowing a monitor into a stowage component, the monitor capable of being opened and closed. The monitor stowage device comprises a motor and an opening-closing mechanism. The motor supplies drive force to the opening-closing mechanism to open and close the monitor. The drive force from the motor is transmitted to the opening-closing mechanism, and the opening-closing mechanism changes the state of the monitor from a closed state to an open state, the closed state in which the monitor is stowed in a stowage space of the stowage component such that the long-side direction of the monitor is aligned with a direction substantially perpendicular to the width direction of the stowage section, and the open state being a state in which the monitor is deployed in such a manner that the long-side direction of the monitor is aligned with the lateral direction.

16 Claims, 18 Drawing Sheets

(51) Int. Cl.
*B63B 29/04* (2006.01)
*B60R 11/00* (2006.01)

(52) U.S. Cl.
CPC . *B64D 11/00153* (2014.12); *B60R 2011/0028* (2013.01); *B60R 2011/0082* (2013.01); *B60R 2011/0089* (2013.01)

(56) References Cited

U.S. PATENT DOCUMENTS

| | | | |
|---|---|---|---|
| 6,256,078 B1 * | 7/2001 | Ogata | B64D 11/0015 |
| | | | 349/58 |
| 7,969,714 B2 * | 6/2011 | Wang | B60R 11/0235 |
| | | | 345/156 |
| 2006/0033847 A1 * | 2/2006 | Kim | F16M 11/105 |
| | | | 348/836 |
| 2007/0046850 A1 | 3/2007 | Wang | |
| 2010/0164336 A1 | 7/2010 | Lee | |
| 2012/0140126 A1 * | 6/2012 | Werth | B60R 11/0235 |
| | | | 348/837 |
| 2013/0242523 A1 * | 9/2013 | Wallace | B60R 11/0235 |
| | | | 361/807 |
| 2013/0259261 A1 | 10/2013 | Mitchell | |

FOREIGN PATENT DOCUMENTS

| | | |
|---|---|---|
| JP | H09-123843 A | 5/1997 |
| JP | 2000-159197 A | 6/2000 |
| JP | 2005-335592 A | 12/2005 |
| JP | 2008-522897 A | 7/2008 |

* cited by examiner

MONITOR STOWAGE DEVICE

PRIORITY

This application claims priority to International Application PCT/JP2013/003396, with an international filing date of May 29, 2013 which claims priority to Japanese Patent Application No. 2012-145436 filed on Jun. 28, 2012. The entire disclosures of International Application PCT/JP2013/003396 and Japanese Patent Application No. 2012-145436 are hereby incorporated herein by reference.

BACKGROUND

Technical Field

The present disclosure relates to a monitor stowage device for stowing an openable and closeable monitor installed on an installation surface such as the ceiling portion of the passenger compartment of an airliner or the like.

Description of the Related Art

Monitor devices for providing passengers with a service that displays video and so forth have been installed in recent years in the passenger compartments of aircraft, trains, buses, passenger boats, and other such means of transportation.

In particular, with an airliner, a monitor that can be stowed away is attached in a rotatable state to the lower part of the overhead compartment on the ceiling above the seats in the passenger compartment (see Patent Literature 1: Japanese Laid-Open Patent Application 2000-159197 (laid open on Jun. 13, 2000)).

Here, the attachment space of the ceiling portion in the passenger compartment has limited width for a monitor stows away into the ceiling and is installed in an aircraft, etc. Therefore, conventional monitors made use of liquid crystal panels and other such display panels that were designed with this width restriction in mind.

SUMMARY

However, the conventional configuration discussed above had the following problem.

Since the configuration disclosed in the above-mentioned publication allowed for the use of only a monitor whose width matched the restricted width of the attachment area, it was difficult to accommodate the need for today's larger screens.

It is an object of the present disclosure to provide a monitor stowage device with which a monitor whose width is greater than the restricted width of the attachment area can still be stowed away.

The monitor stowage device pertaining to the present disclosure is a monitor stowage device for stowing in a stowage position a monitor that is installed in an openable and closeable state into a stowage component provided to an installation surface, comprising a motor and an opening-closing mechanism. The motor supplies drive force for opening and closing the monitor. The opening-closing mechanism receives drive force transmitted from the motor, and changes the monitor from a state of being stowed in the stowage component in a direction in which the long-side direction of the monitor is substantially perpendicular to the width direction of the stowage component, to an open state in which the monitor is deployed in such a manner that the long-side direction of the monitor is aligned with the lateral direction.

With the monitor stowage device pertaining to the present disclosure, a monitor that is wider than the width of the attachment area can be stowed when the attachment area is restricted in width.

DETAILED DESCRIPTION

Embodiments will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims. It will be apparent to those skilled in the art from this disclosure that the following descriptions of the embodiments are provided for illustration only and not for the purpose of limiting the invention as defined by the appended claims and their equivalents.

Embodiment 1

The monitor stowage device 10 pertaining to an embodiment of the present disclosure will now be described through reference to FIGS. 1A to 8.

Figure 1A:
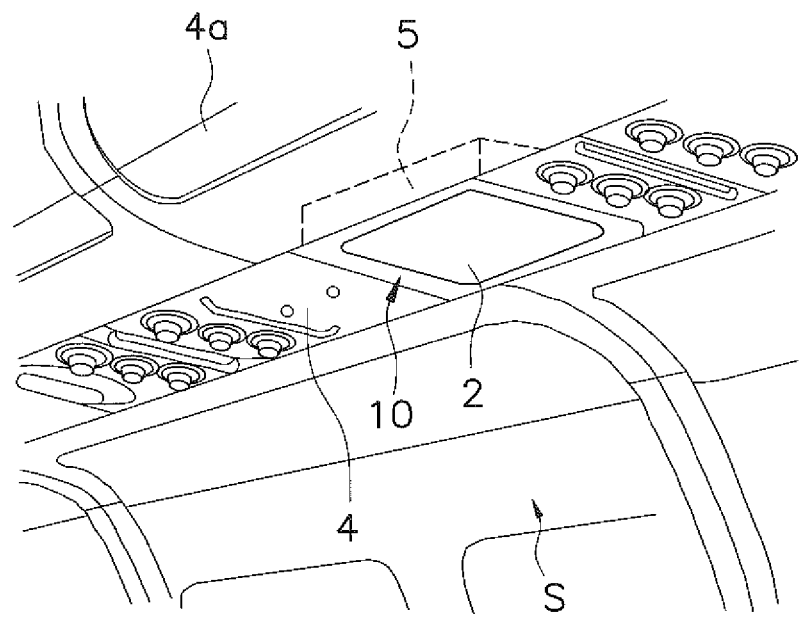
FIG. 1A is an oblique view of a state in which the monitor pertaining to an embodiment of the present disclosure is installed in the ceiling of an aircraft passenger compartment and has been closed.
Figure 1B:
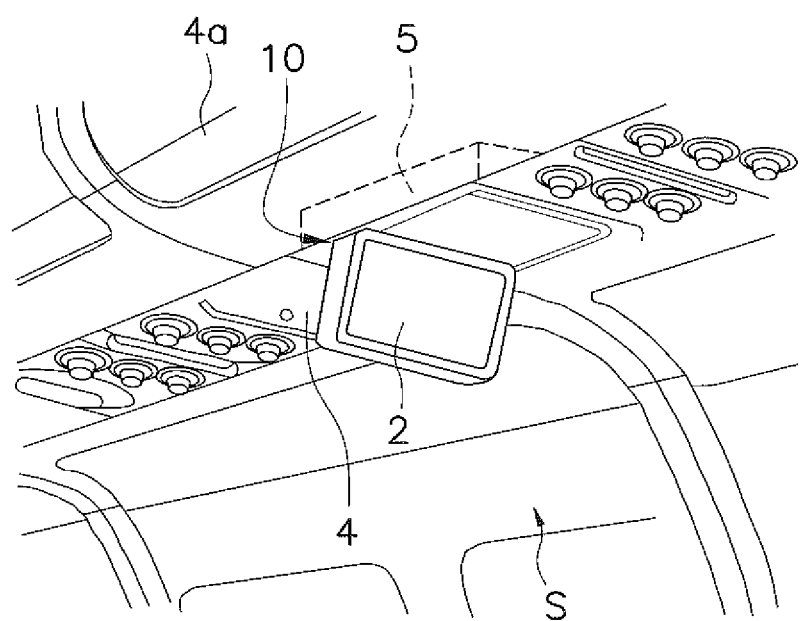
FIG. 1B is an oblique view of the monitor when it is being used.

As shown in FIGS. 1A and 1B, the monitor stowage device 10 pertaining to this embodiment is provided to open and close an openable and closeable monitor 2 that is stowed in a ceiling (installation surface) 4 of a passenger compartment S of an airliner, and in particular in a stowage component 5 provided under an openable and closeable overhead compartment 4a installed in the ceiling 4.

Monitor 2

Figure 2:
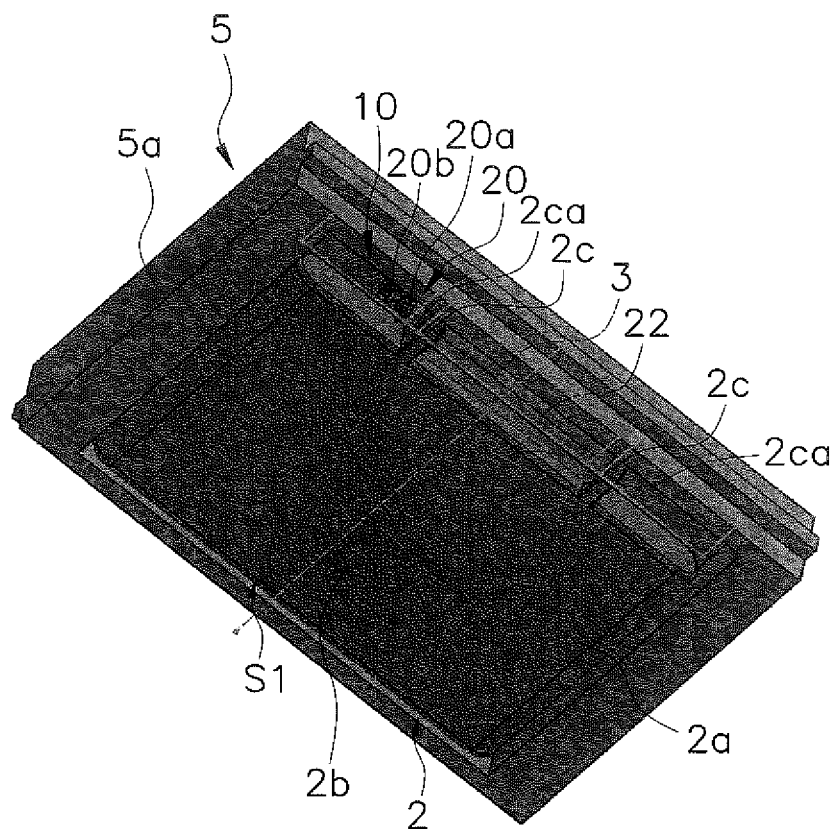
FIG. 2 is an oblique view of the configuration of a monitor and a monitor stowage device in the closed state in FIG. 1A.

As shown in FIGS. 1A and 2, the monitor 2 is stowed in the stowage component 5 so as to be disposed longitudinally as viewed by a seated passenger, that is, so that the width direction (long-side direction) of the monitor 2 runs in the fore and aft direction of the aircraft. The monitor 2 then rotates while pivoting around a rotary shaft 3 (see FIG. 2) that allows pivoting motion, going from a state shown in FIG. 1A in which it is stowed inside the stowage component 5 of the ceiling 4 (closed state), to its usage state (open state) in which it has opened by approximately 110 degrees with respect to the plane of the stowage component 5 as shown in FIG. 1B (see FIG. 2). The operation during the opening and closing of the monitor 2 will be discussed in greater detail below.

Figure 3:
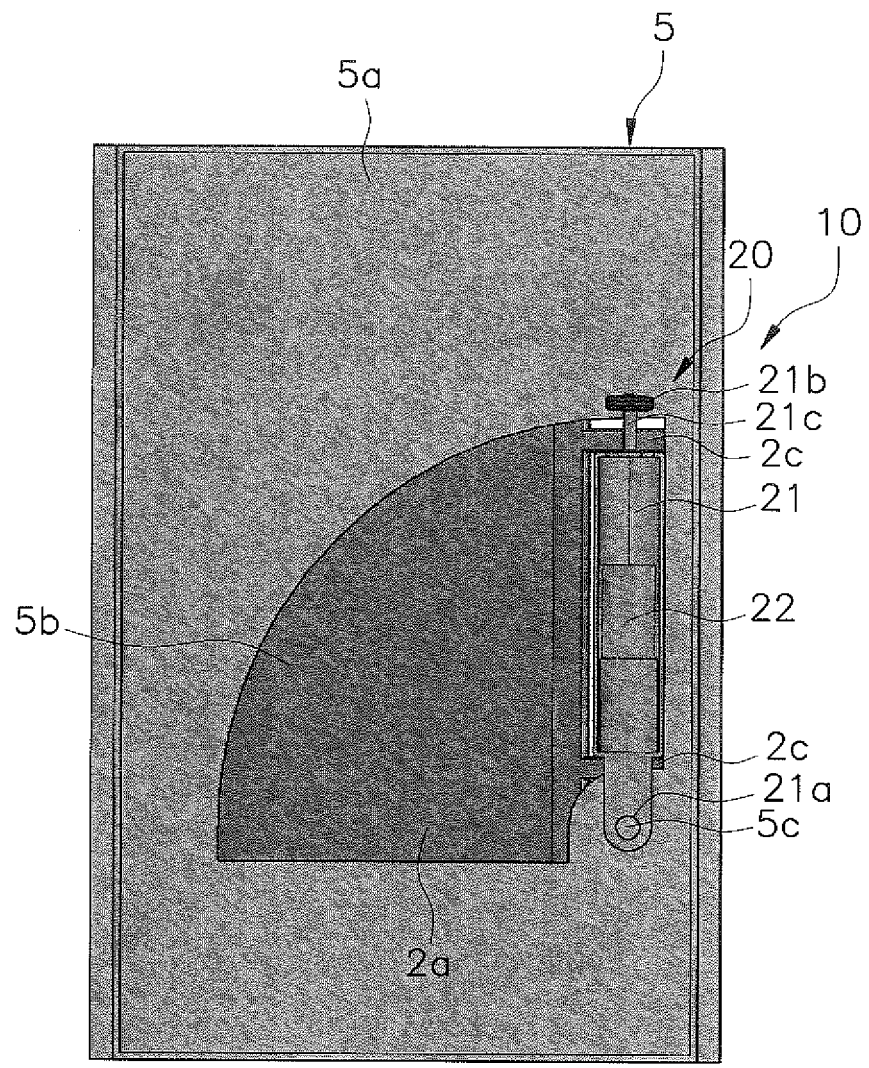
FIG. 3 is a plan view of the configuration of the monitor and monitor stowage device in the closed state in FIG. 2, when viewed from inside the ceiling.

As shown in FIGS. 2 and 3, the monitor 2 has a monitor main body 2a, a display component 2b, and cylindrical components 2c.

As shown in FIG. 2, the monitor main body 2a is provided to display video or the like toward a passenger in the open state, and is a display panel that is substantially square in front view.

The display component 2b is a display panel that makes use of an LCD (liquid crystal display) or the like, and is disposed facing down as shown in FIG. 2 when the monitor is stowed in the stowage component 5.

The cylindrical components 2c are provided at equivalent positions on the left and right sides on the edge of the monitor main body 2a that is on the rotary shaft 3 side, and are substantially circular in shape. As shown in FIG. 2, holes 2ca into which the rotary shaft 3 is inserted are formed in the center portions of the cylindrical components 2c. Consequently, the monitor 2 rotates between its closed and open states when the cylindrical components 2c are supported by the rotary shaft 3.

The monitor 2 is driven open and closed by rotary drive force from a motor 22 of an opening-closing mechanism 20 included in the monitor stowage device 10 (discussed below).

Stowage Component 5

As shown in FIGS. 1A and 1B, the stowage component 5 is provided to part of the ceiling 4 of the passenger compartment S of an airliner. A stowage space S1 (see FIG. 2, etc.) for stowing the monitor 2 is formed therein, and the monitor stowage device 10 for opening and closing the monitor 2 is attached thereto.

As shown in FIG. 3, the stowage component 5 has a stowage component main body 5a, a pivot opening 5b, and a pivot shaft 5c.

The stowage component main body 5a is shaped like a box, and the monitor 2 is stowed in the interior stowage space S1.

As shown in FIG. 3, the pivot opening 5b is a fan-shaped opening formed on the face of the stowage component 5 at the back of the ceiling 4, and is provided as a space that is needed for the rotary shaft 3 of the monitor 2 and other such members to pivot during opening and closing while the monitor 2 is made to pivot by the opening-closing mechanism 20 (discussed below).

The pivot shaft 5c is a portion substantially shaped like a circular column, which protrudes substantially perpendicularly from the face of the stowage component 5 at the back of the ceiling 4, and is inserted into a hole 21a in a pivot component 21. Consequently, this shaft becomes the center of pivoting of the monitor 2 during opening and closing while the monitor 2 pivots under the rotary drive force of the motor 22 (discussed below).

Monitor Stowage Device 10

The monitor stowage device 10 is a mechanism for opening and closing the monitor 2 while the monitor 2 pivots, and is provided at a position that connects the stowage component 5 and the monitor 2. As shown in FIG. 3, the monitor stowage device 10 comprises the opening-closing mechanism 20, the pivot component 21, and the motor 22.

Figure 4A:
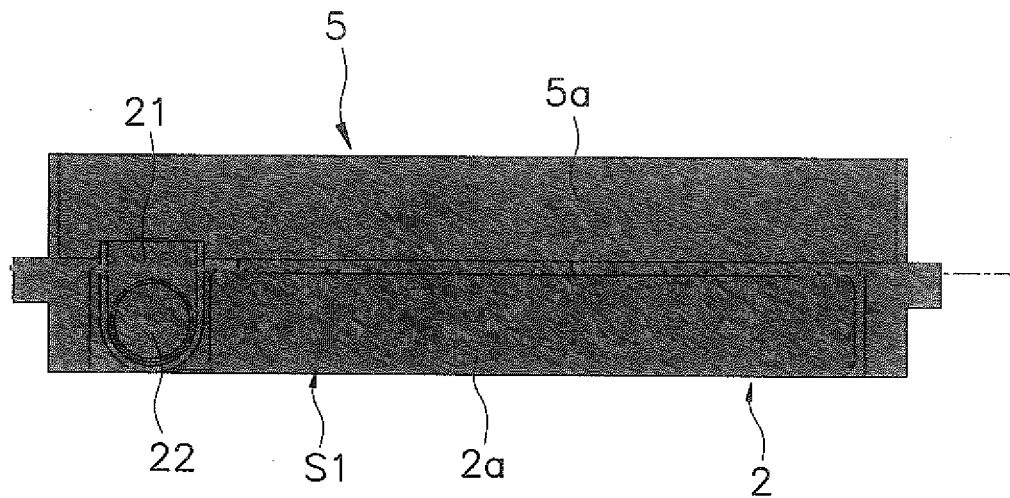
FIGS. 4A and 4B are side views of the configuration of the monitor and monitor stowage device in the closed state in FIG. 2, when viewed from both sides in the rotational axis direction.
Figure 4B:
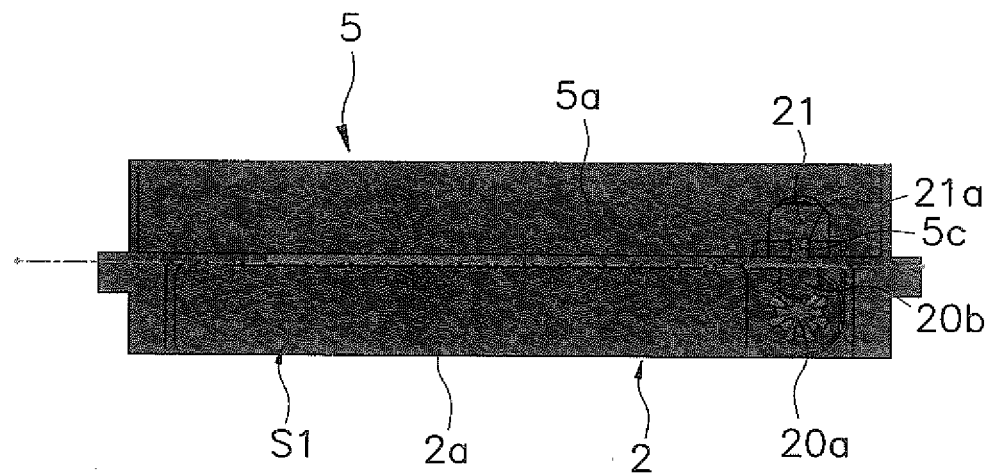

The opening-closing mechanism 20 receives the rotary drive force of the motor 22 shown in FIG. 4A and rotates the monitor 2 around the rotary shaft 3, and also causes the monitor 2 to pivot around the pivot shaft 5c. As shown in FIG. 4B, the opening-closing mechanism 20 has a gear (first bevel gear) 20a and a pivot gear (second bevel gear) 20b.

The gear 20a is linked directly to the rotary shaft of the motor 22, and is a bevel gear that is rotated by the rotary drive force of the motor 22 around the rotary shaft of the monitor 2. The gear 20a is fixed in a non-rotatable state within the holes 2ca formed in the cylindrical components 2c of the monitor 2. This allows the monitor 2 to be rotated around the rotary shaft 3 when the gear 20a is rotated.

Figure 5:
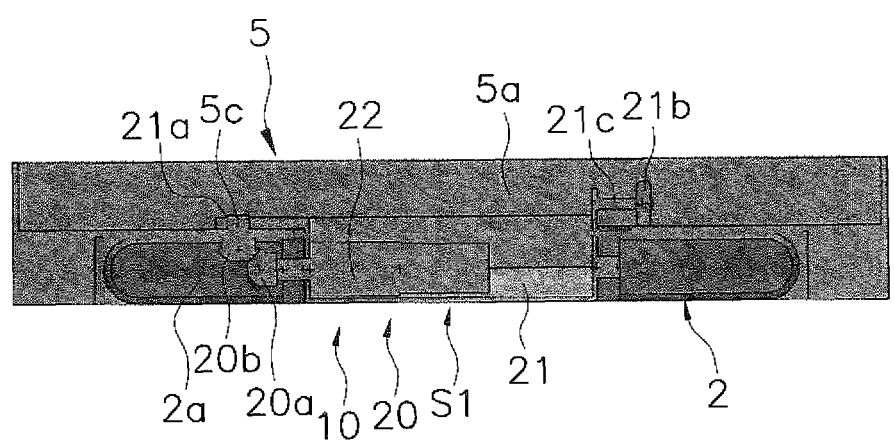
FIG. 5 is a side view of the configuration of the monitor and monitor stowage device in the closed state in FIG. 2, when viewed from the rotational axis side.

The pivot gear 20b is a bevel gear just like the gear 20a, and is disposed with the gear portion facing down, in a direction that is substantially perpendicular to the rotary shaft 3 of the monitor 2 (the up and down direction in FIG. 4B). As shown in FIG. 5, the pivot gear 20b rotates around the pivot shaft 5c while meshed with the gear 20a.

As shown in FIG. 5, the pivot gear 20b is attached in a state of being inserted into the hole 21a formed on the first end side of the pivot component 21. Consequently, the pivot gear 20b is such that the center of the circular column supported by the hole 21a functions as the pivot shaft 5c.

Furthermore, the pivot gear 20b is fixed in a non-rotatable state with respect to the pivot component 21 inside the hole 21a. Consequently, when the pivot gear 20b is rotated, the pivot component 21 (that is, the monitor 2) can be pivoted around the pivot shaft 5c with respect to the stowage component 5 (the ceiling 4).

The pivot component 21 is provided in the stowage component 5 and near the rotary shaft 3 of the monitor 2 in a non-pivotable state along with the monitor 2 with respect to the stowage component 5 (the ceiling 4). As shown in FIG. 4A, the pivot component 21 has a box shape whose bottom face is substantially cylindrical, and the substantially cylindrical motor 22 is provided on the inside.

In the closed state shown in FIG. 3, the pivot component 21 is disposed in the long-side direction of the stowage space S1 of the stowage component 5. Meanwhile, in the open state shown in FIG. 8, the pivot component 21 is disposed in the short-side direction of the stowage space S1 of the stowage component 5. Consequently, the rotary shaft 3 of the monitor 2 can be pivoted by approximately 90 degrees inside the stowage component 5.

As shown in FIGS. 3 and 5, the pivot component 21 has the hole 21a, a pivot roller (support component) 21b, and a roller support shaft 21c.

The hole 21a is a circular through-hole formed on the first end side that becomes the pivot shaft 5c in the pivot component 21, and the shaft portion of the pivot gear 20b is inserted therein. As discussed above, the pivot gear 20b is fixed in a non-rotatable state inside the hole 21a.

The pivot roller 21b is provided in a non-rotatable state on the second end side, which is on the opposite side from the above-mentioned first end, in the pivot component 21, and supports the monitor 2 at the second end side. Also, the pivot roller 21b moves along the arc portion of the pivot opening 5b of the stowage component 5 during opening and closing while the monitor 2 pivots, as a result of the rotation of the gear 20a and the pivot gear 20b meshed with it, under the rotational drive force of the motor 22.

The roller support shaft 21c is a substantially columnar portion provided so as to provide along the rotary shaft 3 from the second end side of the pivot component 21, and the pivot roller 21b is attached in a non-rotatable state. Thus, the roller support shaft 21c is the rotational center of the pivot roller 21b.

The motor 22 is the drive source that generates the rotational drive force for opening and closing the monitor 2, and as shown in FIG. 3, is fixed within the pivot component 21 provided between the left and right cylindrical components 2c of the monitor 2. Also, the motor 22 transmits rotational drive force to the cylindrical components 2c of the monitor 2 via the gear 20a and the pivot gear 20b included in the opening-closing mechanism 20.

The rotational axis of the motor 22 is directly linked to the gear 20a provided on the first end side that becomes the pivot shaft 5c side. Consequently, the rotational drive force of the motor 22 is directly transmitted to the gear 20a, and is transmitted via the pivot gear 20b meshed with the gear 20a, allowing the monitor 2 to be opened and closed while pivoting.

Specifically, as shown in FIG. 1A, the monitor stowage device 10 in this embodiment uses two bevel gears (the gear 20a and the pivot gear 20b) included in the opening-closing mechanism 20 to move the closed monitor 2, which is stowed longitudinally in the stowage component 5, to an open state in which it is deployed so that its width direction aligns with the lateral direction, as shown in FIG. 1B.

Consequently, just as when the monitor 2 is rotated around the rotary shaft 3 by the rotation of the gear 20a, the pivot shaft 5c is pivoted around the pivot shaft 5c by the rotation of the pivot gear 20b meshed with the gear 20a, which allows the monitor 2 that is stowed longitudinally in the stowage component 5 to be opened and closed so as to be deployed laterally.

That is, the combination of two bevel gears allows the rotation direction of the gear 20a to be converted into a perpendicular direction, and the pivot gear 20b to be rotated, because of the characteristics of bevel gears.

More specifically, the rotation of the gear 20a is transmitted as drive force that rotates the monitor 2 around the rotary shaft 3. Meanwhile, the rotation of the pivot gear 20b is transmitted as drive force that pivots the monitor 2 around the pivot shaft 5c.

Consequently, when the motor 22 is driven, the operation of rotating the monitor 2 around the rotary shaft 3 and the operation of pivoting the monitor 2 around the pivot shaft 5c can be carried out in parallel, at the same time.

Operation of Monitor Stowage Device 10

Opening Operation

With the monitor stowage device 10 in this embodiment, when the monitor 2 is changed from its closed state (see FIGS. 2 to 5) to its open state (see FIGS. 7 and 8), the rotational drive force of the motor 22 is transmitted via the gear 20a and the pivot gear 20b.

Specifically, when the monitor 2 is deployed by the rotational drive force of the motor 22 from the closed state shown in FIG. 2, etc., the rotation of the gear 20a directly linked to the motor 22 causes the monitor 2 to rotate around the rotary shaft 3. Also, in parallel with this rotation of the monitor 2, the rotation of the pivot gear 20b meshed with the gear 20a causes the monitor 2 to pivot around the pivot shaft 5c.

Figure 6:
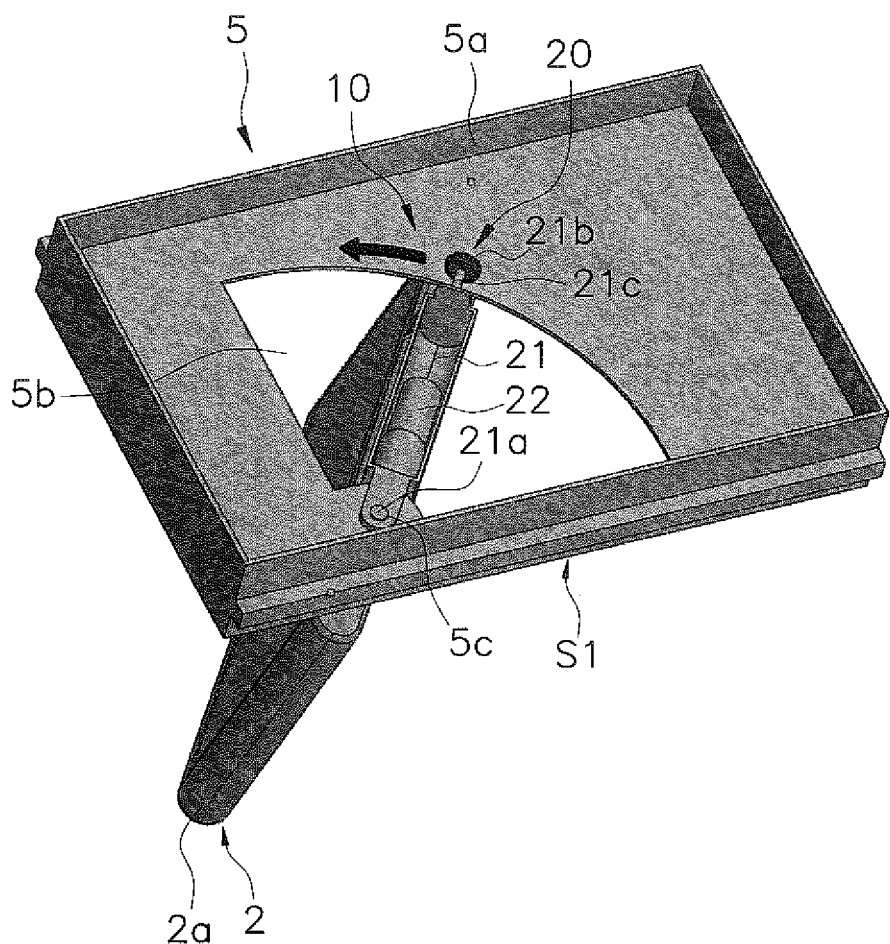
FIG. 6 is an oblique view of a monitor in an intermediate position as it is being opened from the closed state in FIG. 2.

At this point, the rotation of the pivot gear 20b causes the pivot component 21 attached to the long edge on the upper side of the monitor 2 to pivot around the pivot shaft 5c. Thus, as shown in FIG. 6, the monitor 2 is supported on the first end side of the upper long edge by the pivot gear 20b, and the opposite second end side is supported by the pivot roller 21b, in which state the monitor 2 pivots around the pivot shaft 5c along with the pivot component 21.

Figure 7:
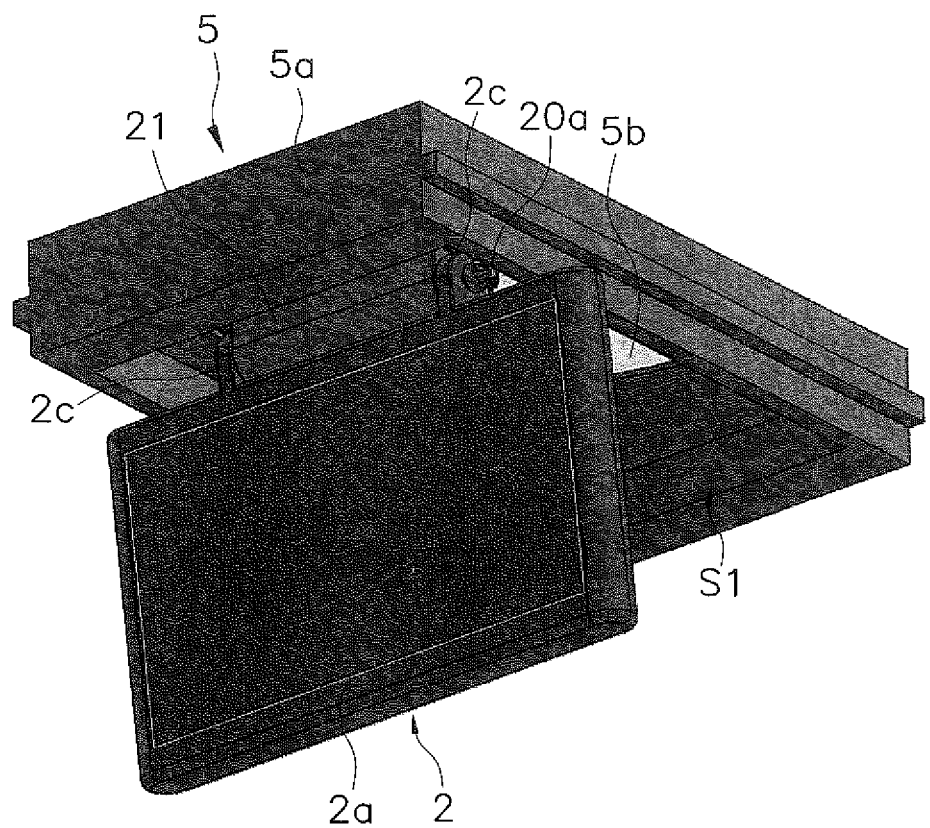
FIG. 7 is an oblique view of the configuration of the monitor and monitor stowage device in the open state in FIG. 1B.

When drive force is transmitted by the motor 22 in the direction in which the monitor 2 opens, as shown in FIG. 7, the monitor 2 opens to an aperture of about 110 degrees with respect to the plane of the ceiling 4, and moves to its open state (usage state) in which it has pivoted by 90 degrees.

Figure 8:
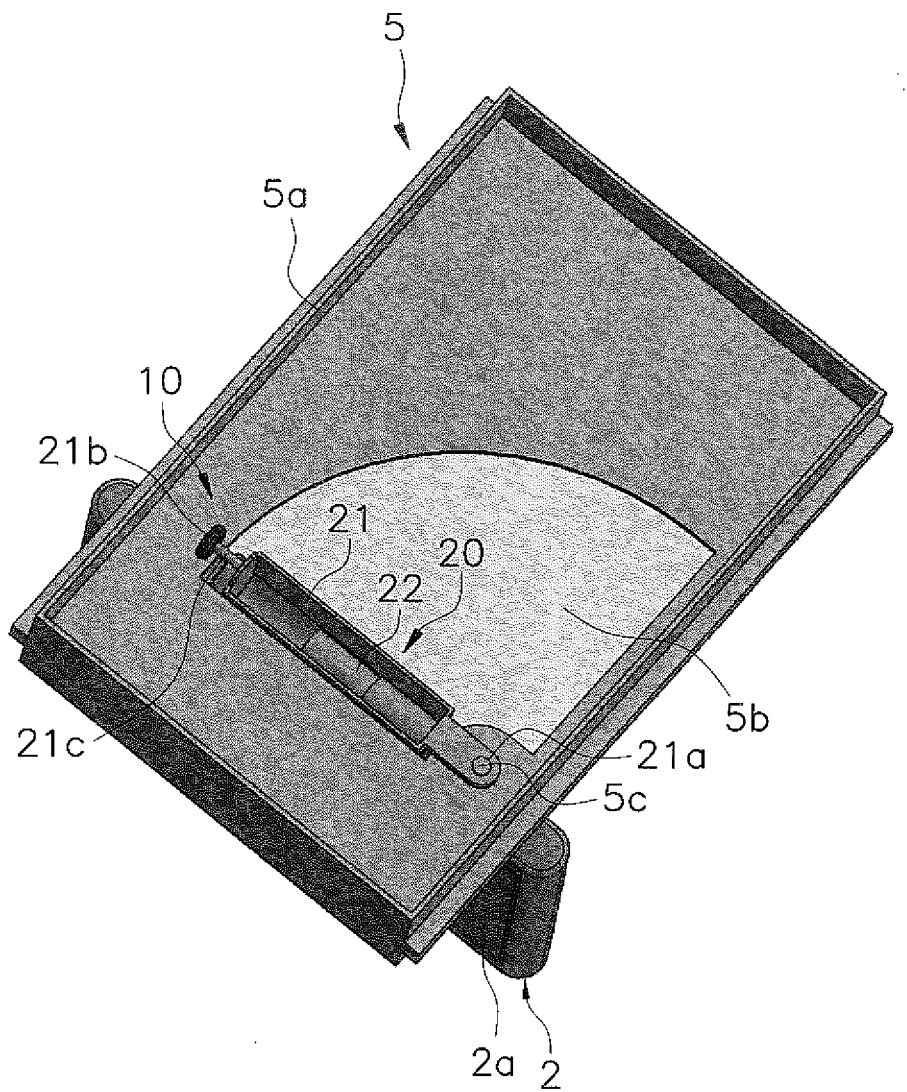
FIG. 8 is an oblique view of the configuration of the monitor and monitor stowage device in the open state in FIG. 7, when viewed from inside the ceiling.

At this point, as shown in FIG. 8, inside the pivot opening 5b formed in the stowage component 5, the pivot component 21 attached to the upper long edge of the monitor 2 is held in a state in which it has pivoted by 90 degrees around the pivot shaft 5c from the closed state shown in FIG. 3.

Consequently, when stowed away, the monitor 2 is stowed longitudinally, and is deployed by a combination of rotation and pivoting of the monitor 2, so that even if there is a restriction in the width direction on the stowage space S1 of the monitor 2, a monitor 2 that is larger than the width of the stowage space S1 can be mounted and deployed.

Closing Operation

Conversely, when going from the open state shown in FIG. 8, etc., to the closed state shown in FIG. 2, etc., the monitor 2 is stowed into the stowage space S1 of the stowage component 5 by the reverse operation as that discussed above.

Specifically, when the motor 22 is rotated backward from the open state shown in FIG. 8, etc., so that the monitor 2 is changed to its closed state in which it is stowed in the stowage space S1 as shown in FIG. 2, etc., the gear 20a and the pivot gear 20b are also rotated backward.

Consequently, the monitor 2 rotates around the rotary shaft 3 so as to be in a parallel state from a state of approximately 110 degrees with respect to the plane of the ceiling 4, and pivots around the pivot shaft 5c in order to be stowed longitudinally in the stowage space S1.

Thus, the monitor 2 first goes through the intermediate position shown in FIG. 6, and is again stowed in the stowage space S1.

Effect of this Monitor Stowage Device 10

(1)

As shown in FIG. 1A, the monitor stowage device 10 in this embodiment is a device for stowing in the stowage component 5 the monitor 2 installed in an openable and closeable state in the stowage component 5 provided to the ceiling 4, and as shown in FIG. 6, etc., it comprises the motor 22 and the opening-closing mechanism 20. The motor 22 provides the opening-closing mechanism 20 with drive force for opening and closing the monitor 2. The drive force from the motor 22 is transmitted to the opening-closing mechanism 20, which changes the monitor 2 from the closed state shown in FIG. 2, etc., in which it is stowed in the stowage space S1 of the stowage component 5 in a direction in which the long-side direction of the monitor 2 is substantially perpendicular to the width direction of the stowage component 5, to the open state in which the monitor 2 is deployed so that its long-side direction shown in FIG. 7, etc., is aligned with the lateral direction.

There are cases, for example, in which the monitor 2 installed in the ceiling 4 of the passenger compartment S of an airliner is restricted by the width of the stowage space S1 of the stowage component 5. Accordingly, a mechanism that opens and closes the monitor by rotating it around a rotary shaft provided to the end of the monitor cannot accommodate the need for today's larger monitors.

As discussed above, with the monitor stowage device 10 in this embodiment, the monitor 2 is pivoted around the pivot shaft 5c while being rotated around the rotary shaft 3, which changes the monitor 2 from its closed state to its open state.

Consequently, the orientation of the monitor 2 stowed longitudinally in the stowage space S1 is changed from a state of being substantially parallel to the plane of the stowage component 5 to a state of having been rotated by approximately 110 degrees, and the long-side direction of the monitor 2 (the width direction of the monitor 2) is changed to a state of having been pivoted by approximately 90 degrees, which allows the monitor 2 to be moved three-dimensionally and deployed to its usage state.

Thus, even if the stowage component 5 of the monitor 2 is restricted in the width direction, a monitor 2 having a width that is greater than the width of the stowage space S1 can still be attached, which makes it possible to accommodate the need for today's larger screens.

(2)

As shown in FIGS. 4B, 5, etc., with the monitor stowage device 10 in this embodiment, the opening-closing mechanism 20 has the gear (first bevel gear) 20a that is disposed on the first end side in the long-side direction of the monitor 2 and in which the rotary shaft 3 is provided along the long-side direction of the monitor 2, and the pivot gear (second bevel gear) 20b that is fixed on the stowage component 5 (ceiling 4) side so as to mesh with the gear 20a.

Consequently, the monitor 2 can be opened and pivoted by transmitting the rotational drive force of the motor 22 through the two bevel gears (the gear 20a and the pivot gear 20b) by means of a simple configuration. Thus, the orientation of the monitor 2 can be changed three-dimensionally while the monitor 2 transitions from its closed state to its open state.

(3)

As shown in FIG. 6, etc., the monitor stowage device 10 in this embodiment further comprises the pivot component 21 as a support mechanism that supports the second end on the opposite side from the first end where the gear 20a and the pivot gear 20b are provided in the long-side direction of the monitor 2, during deployment of the monitor 2.

Consequently, the monitor 2 can be supported near both ends at the rotary shaft 3 even when the monitor 2 is rotated around the rotary shaft 3 and pivoted around the pivot shaft 5c. This allows the weight of even a large monitor 2 to be supported.

(4)

As shown in FIG. 6, etc., with the monitor stowage device 10 in this embodiment, the pivot component 21 provided as a support mechanism has the pivot opening 5b formed in the stowage component 5 along the deployment direction of the monitor 2, and the pivot roller 21b that supports the second end side of the monitor 2 while moving along the pivot opening 5b.

Consequently, the pivot roller 21b rolls over the upper face of the stowage component 5, allowing the monitor 2 to pivot around the pivot shaft 5c, and supporting the second end side of the pivot component 21 fixed on the rotary shaft 3 side of the monitor 2.

(5)

As shown in FIG. 6, etc., with the monitor stowage device 10 in this embodiment, the motor 22 is directly linked to the gear 20a, and is provided on the monitor 2 side (to the pivot component 21 fixed on the rotary shaft 3 side of the monitor 2).

Consequently, the monitor 2 can be driven in a state in which the motor 22 is stowed in the space inside the pivot component 21 provided on the rotary shaft 3 side of the monitor 2.

Embodiment 2

A monitor stowage device 110 pertaining to another embodiment of the present disclosure will now be described through reference to FIGS. 9 to 12.

Figure 9:
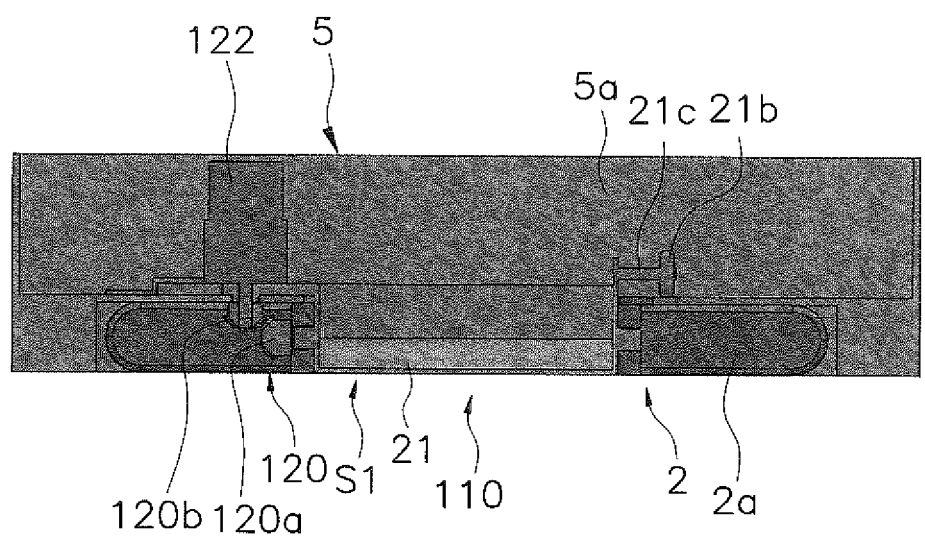
FIG. 9 is a side view of the configuration of the monitor and monitor stowage device pertaining to another embodiment of the present disclosure, when viewed from the rotational axis side.
Figure 10:
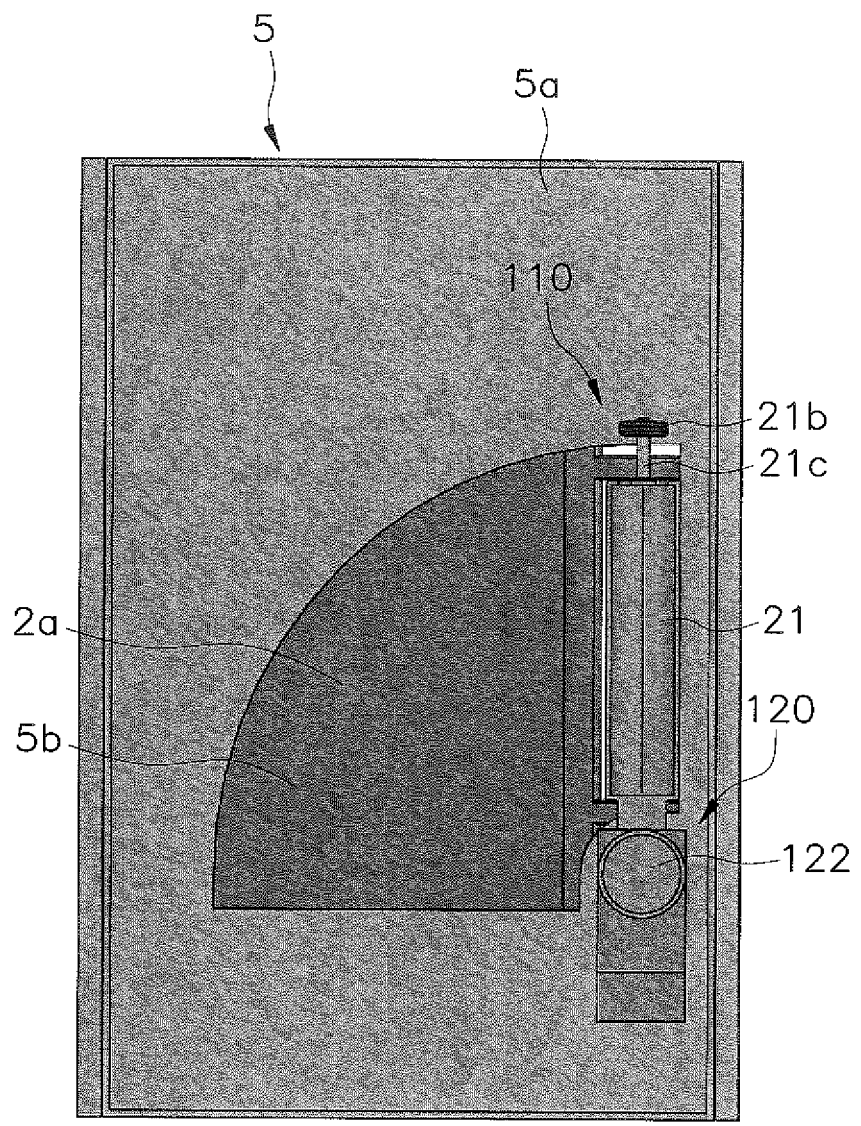
FIG. 10 is a plan view of the configuration of the monitor and monitor stowage device in the closed state in FIG. 9, when viewed from inside the ceiling.

As shown in FIGS. 9 and 10, the monitor stowage device 110 in this embodiment differs from Embodiment 1 above, in which the motor 22 was provided on the monitor 2 side and directly linked to the gear 20a, in that a motor 122 that imparts a drive force for rotating two bevel gears (a gear 120a and a pivot gear 120b) included in an opening-closing mechanism 120, is provided on the stowage component 5 side and is directly linked on the pivot gear 120b side. The rest of the configuration is basically the same as in Embodiment 1.

Specifically, with the monitor stowage device 110 in this embodiment, the motor 122 that imparts drive force for opening and closing the monitor 2 is disposed on the stowage component 5 side, rather than on the monitor 2 (the pivot component 21) side.

More specifically, the motor 122 is provided on the first end side of the stowage component 5 where the gear 120a of the opening-closing mechanism 120 is provided. The motor 122 is directly linked to the pivot gear 120b that pivots the monitor 2 as shown in FIG. 9, rather than to the gear 120a that rotates the monitor 2. Accordingly, the rotational drive force of the motor 122 is directly transmitted to the pivot gear 120b that is directly linked to the rotary shaft of the motor 122, and pivots the monitor 2 around the pivot shaft 5c. At the same time, in parallel with this pivoting, rotational drive force is transmitted to the gear 120a meshed with the pivot gear 120b, which rotates the monitor 2 around the rotary shaft 3.

Just as with the gear 20a in Embodiment 1 above, we will assume that the gear 120a rotates integrally with the cylindrical components 2c of the monitor 2. Similarly, the pivot gear 120b rotates integrally with the pivot component 21, just as with the pivot gear 20b in Embodiment 1 above.

Figure 11:
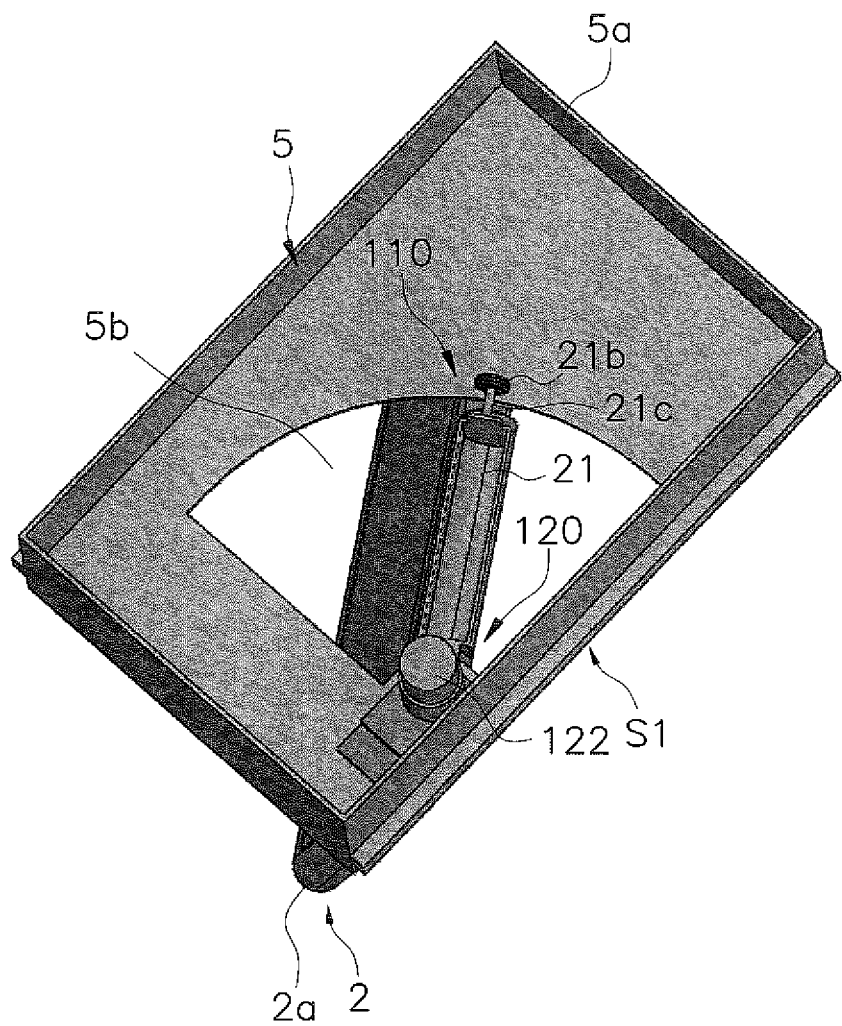
FIG. 11 is an oblique view of a monitor in an intermediate position as it is transitioning from the closed state in FIG. 9 to an open state.
Figure 12:
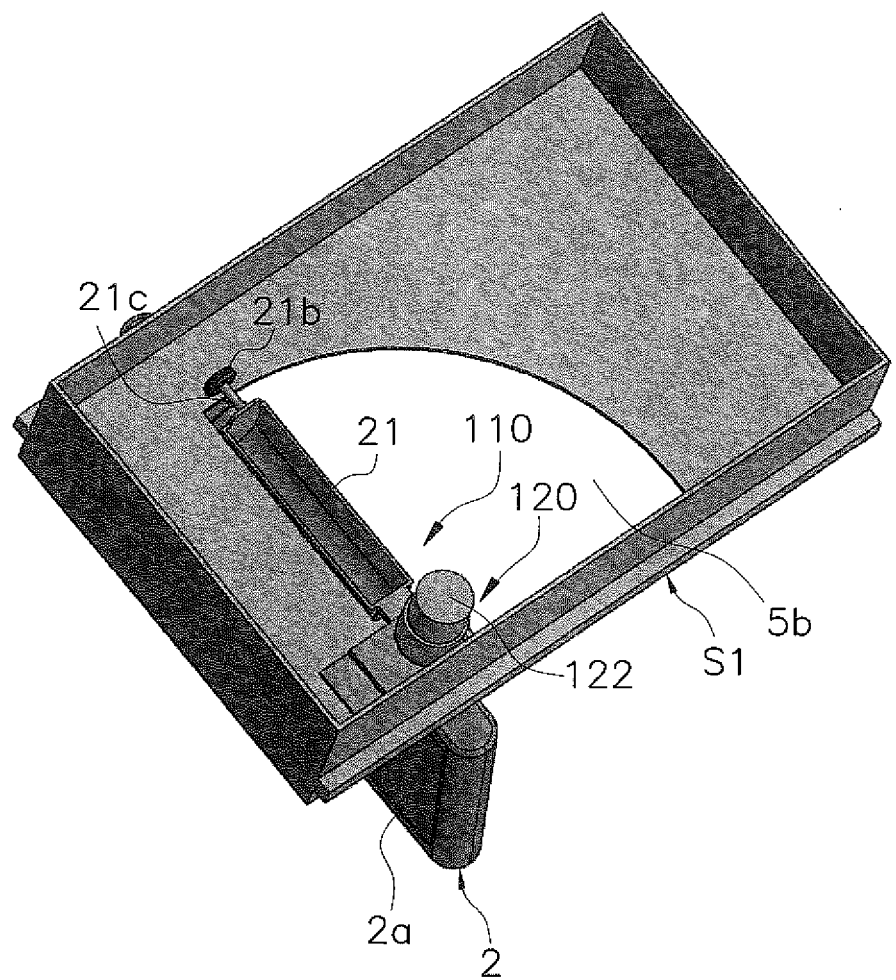
FIG. 12 is an oblique view of a state in which the monitor has transitioned from the intermediate position in FIG. 11 to an open state.

As shown in FIGS. 11 and 12, when the monitor 2 is being deployed from the closed state shown in FIG. 10, the position of the motor 122 does not change from the closed state until the open state is reached. Thus, when the monitor 2 is opened or closed while rotating and pivoting, the weight of the motor 122 is not exerted on the monitor 2 side. As a result, the configuration of the support mechanism (the pivot component 21, etc.) that supports the monitor 2 can be simplified, and another benefit is that the motor 122 can be more compact since the drive force is reduced in the deploying and stowing of the monitor 2.

That is, the monitor stowage device 110 in this embodiment has the same effect as that obtained in Embodiment 1 above, and since the motor 122 is provided on the stowage component 5 side, the configuration can be simplified.

Embodiment 3

A monitor stowage device 210 pertaining to yet another embodiment of the present disclosure will now be described through reference to FIGS. 13 to 16.

Figure 13:
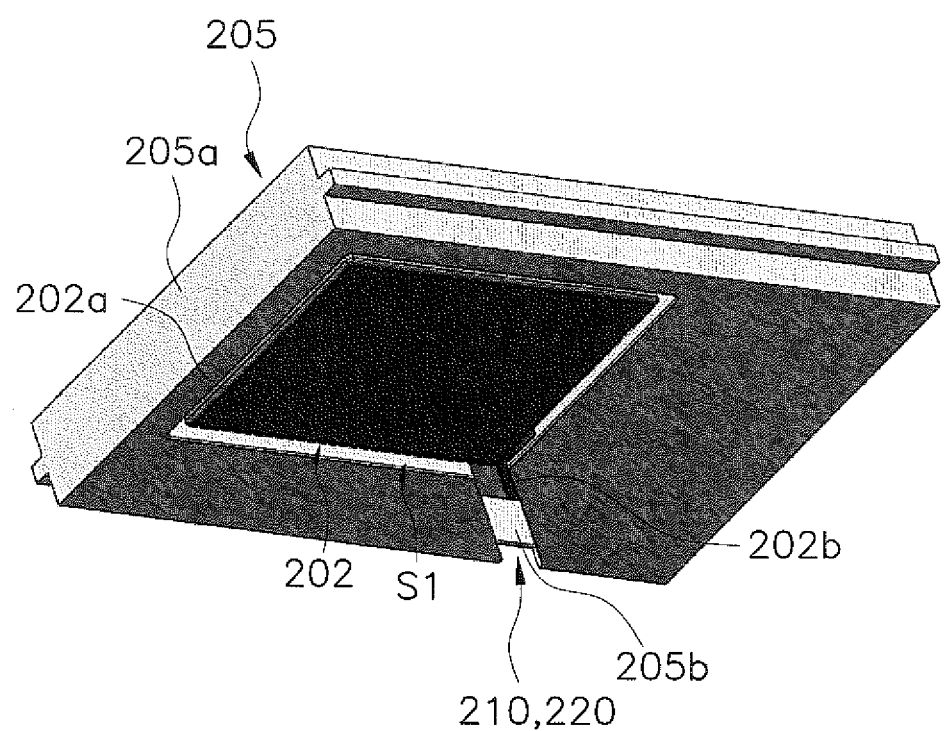
FIG. 13 is an oblique view of the configuration of a monitor stowage device and monitor pertaining to yet another embodiment of the present disclosure.
Figure 14:
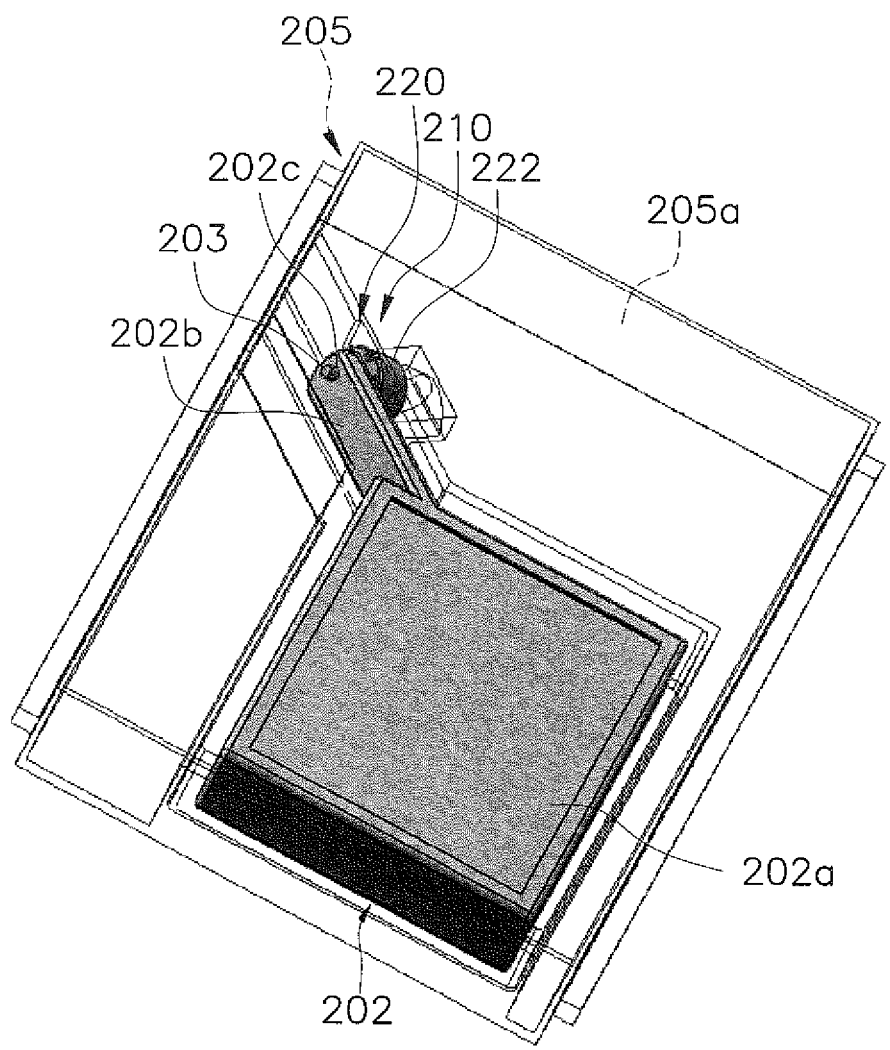
FIG. 14 is an oblique view of the monitor and monitor stowage device in FIG. 13, as seen from inside the ceiling.

As shown in FIGS. 13 and 14, the monitor stowage device 210 in this embodiment differs from Embodiments 1 and 2 above, in which the monitor 2 was opened and closed by the opening-closing mechanisms 20 and 120 that included two bevel gears, in that the monitor 2 is opened and closed using a simple opening-closing mechanism 220 that rotates a motor 222 by changing the orientation of a rotary shaft 203 and a shaft support 202b of a monitor 202.

Figure 15:
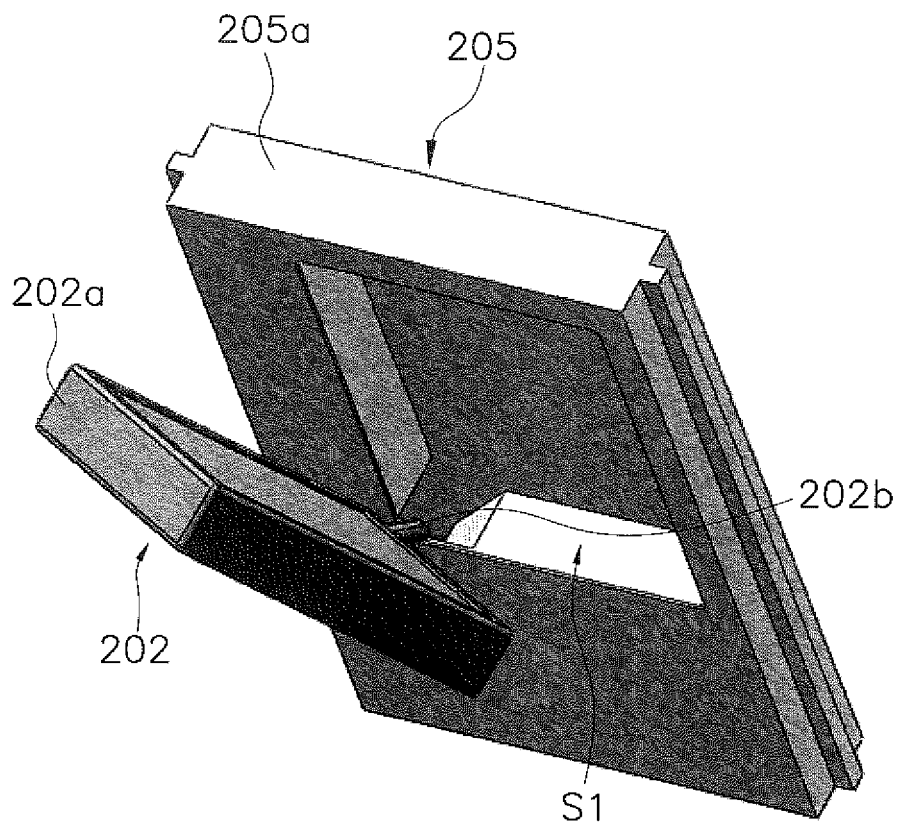
FIG. 15 is an oblique view of a monitor in an intermediate position as it is being opened from the closed state in FIG. 13.
Figure 16:
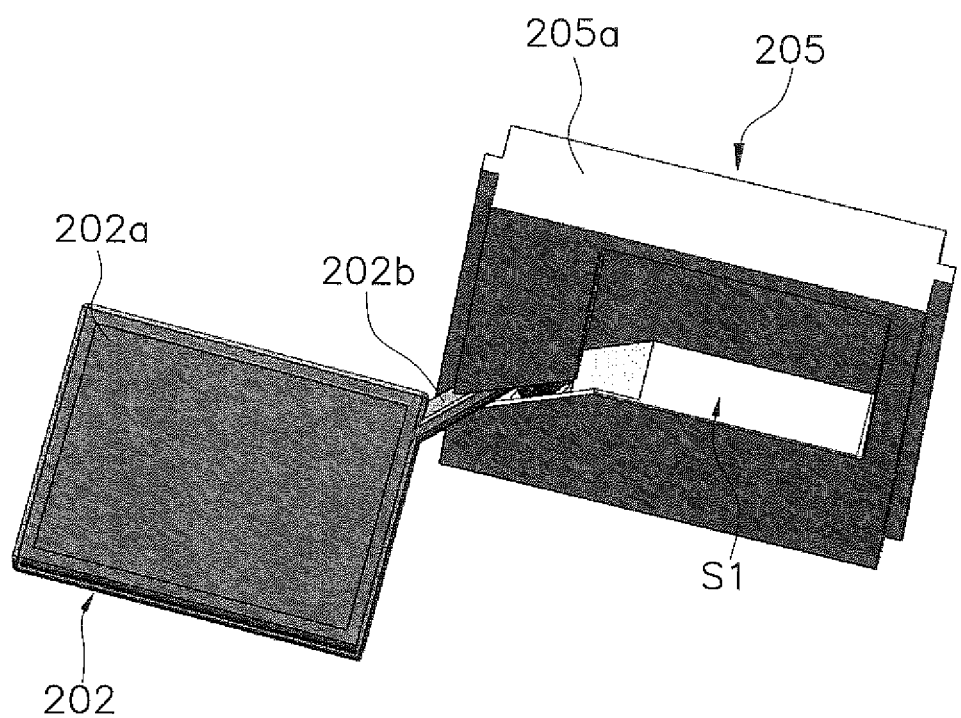
FIG. 16 is an oblique view of a state in which the monitor has transitioned from the closed state in FIG. 13 to an open state.

As shown in FIG. 13, etc., the monitor stowage device 210 in this embodiment changes the monitor 202 from a closed state in which the monitor 202 is stowed in the stowage space S1 formed inside a stowage component main body 205a of a stowage component 205, through the intermediate position shown in FIG. 15, to the open state shown in FIG. 16.

The monitor stowage device 210 rotates the shaft support 202b of the monitor 202 around the rotary shaft 203 within a rotation space 205b cut out at a 45-degree angle to the plane of the stowage component 205, in order to deploy the monitor 202 stowed longitudinally with respect to the stowage component 205 so that its long-side direction is aligned with the lateral direction.

More specifically, as shown in FIG. 14, the rotary shaft of the motor 22 that becomes the rotary shaft 203 of the monitor 202 is attached in a state of being angled at approximately 45 degrees to the plane of the stowage component 205 so as to be substantially perpendicular to the rotation space 205b formed in the stowage component 205.

Also, as shown in FIGS. 14 and 16, the shaft support 202b that supports the monitor 202 is formed integrally with a monitor main body 202a in a state of being angled at approximately 45 degrees to the side face of the monitor main body 202a.

With the monitor stowage device 210 in this embodiment, as discussed above, the rotary shaft 203 that serves as the rotational center around which the monitor 202 is rotated in three-dimensional space is provided in a state of being angled at approximately 45 degrees to the plane of the stowage component 205 and to the side face of the monitor 202.

Consequently, even with a simple mechanism in which the rotational drive force of the motor 222 is directly transmitted to the monitor 202, the orientation of the monitor 202 can be changed from longitudinal to lateral, and the monitor 202 can be transitioned from a state of being closed with respect to the stowage component 205 to an open state that allows the passenger to look at the monitor.

Other Embodiments

Embodiments of the present disclosure were described above, but the present disclosure is not limited to or by these embodiments, and various modifications are possible without departing from the gist of the disclosure.

(A)

In Embodiments 1 and 2 above, an example was given in which the monitor 2 was opened and closed by the opening-closing mechanisms 20 and 120 that included two bevel gears (the gear 20a and the pivot gear 20b, or the gear 120a and the pivot gear 120b), but the present disclosure is not limited to this.

Figure 17A:
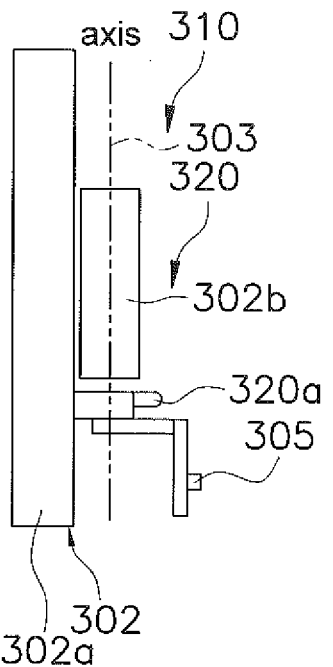
FIGS. 17A and 17B are a side view and a plan view of the configuration in a state in which the monitor of the monitor stowage device pertaining to yet another embodiment of the present disclosure has been closed.
Figure 17B:
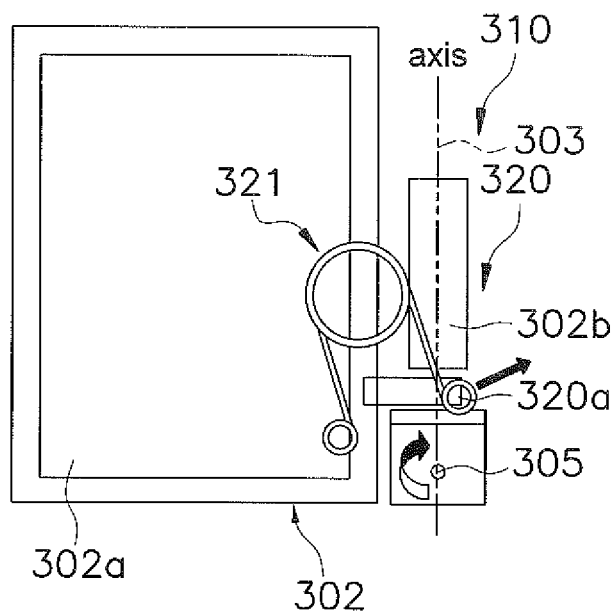
Figure 17C:
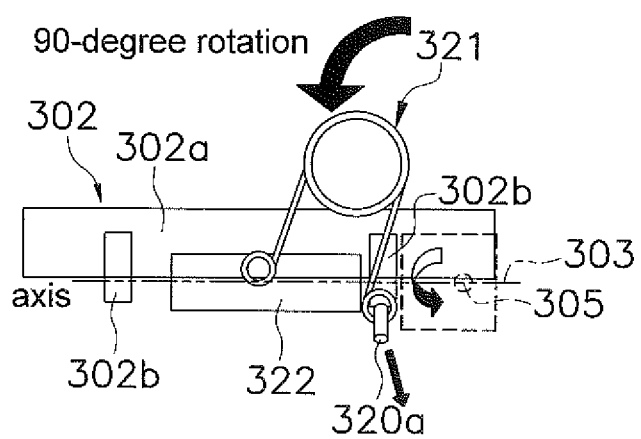
FIG. 17C is a plan view of the configuration in a state in which the monitor has been opened.

For example, a monitor stowage device 310 may be equipped with an opening-closing mechanism 320 featuring a toggle spring 321 that biases a monitor 302 in the closing direction in the closed state in which the monitor 302 is stowed in a stowage space by a motor 322, as shown in FIGS. 17A and 17B, and that biases the monitor 302 in the opening direction in the open state of the monitor 302, as shown in FIG. 17C.

The monitor 302 has a monitor main body 302a and cylindrical components 302b provided to the ends on a rotary shaft 303 side. A substantially cylindrical latching component 320a that protrudes outward in the radial direction is formed on the outer peripheral face of one of the cylindrical components 302b.

The cylindrical component 302b on which the latching component 320a is formed is directly linked to the rotary shaft of the motor 322. Accordingly, the rotational drive force of the motor 322 is directly transmitted to the cylindrical components 302b and the latching component 320a formed on the outer peripheral face thereof.

A first end of the toggle spring 321 is fixed to the latching component 320a. Consequently, when the rotary shaft of the motor 322 rotates, since the first end is connected to the latching component 320a, the toggle spring 321 is compressed so that the distance between the first and second ends is decreased. When the rotation of the motor 322 then causes the latching component 320a to rotate further around the rotary shaft 303, the distance between the first and second ends of the toggle spring 321 increases again, going through a dead point at which the distance between the first and second ends is at its shortest.

With this monitor stowage device 310, the rotary shaft 303 is formed along the upper long side of the monitor main body 302a in the open state, and the rotational drive force of the motor 322 disposed along the rotary shaft 303 is transmitted to deploy the monitor 302 from its closed state to its open state.

As shown in FIG. 17B, the toggle spring 321 biases the monitor 302 in the closing direction in plan view in the closed state. When the rotational drive force of the motor 322 is transmitted and the monitor 302 is deployed, the substantially circular columnar latching component 320a directly linked to the rotary shaft of the motor 322 that rotates the monitor 302 rotates around the rotary shaft 303. Thereupon, the toggle spring 321, one end of which is fixed to the latching component 320a, begins to be compressed. When the latching component 320a rotates further, and the toggle spring 321 is further compressed past the dead point, the characteristics of the toggle spring 321 result in a reversal of the direction in which an attachment base 323 of the monitor 302 is biased.

Figure 18A:
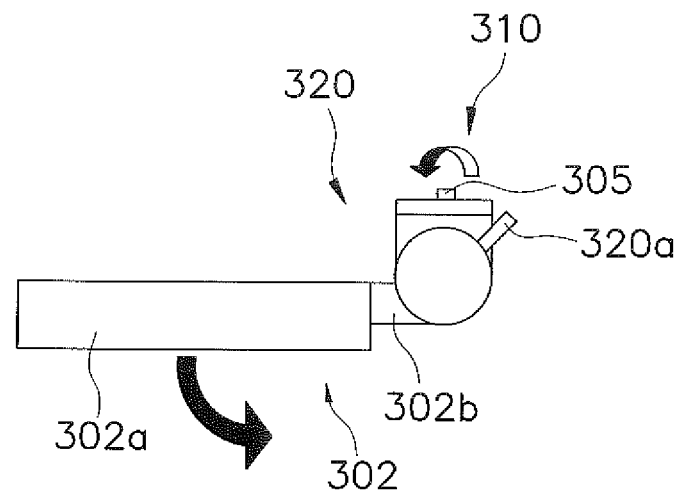
FIG. 18A is a front view of the closed state of a monitor that is opened and closed by the monitor stowage device in FIGS. 17A to 17C.
Figure 18B:
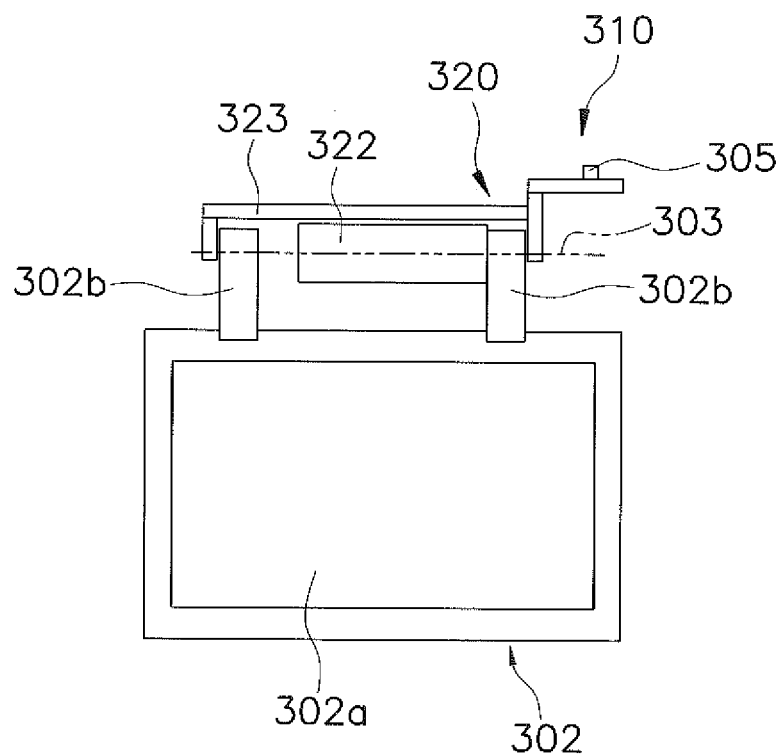
FIG. 18B is a front view of the open state of the monitor.

Consequently, when the monitor 302 is further driven by the rotational drive force of the motor 322 from the closed state shown in FIG. 18A, through a specific intermediate point, the biasing force of the toggle spring 321, whose biasing direction has been reversed, allows the attachment base 323 of the motor 322 to be pivoted by 90 degrees around a pivot shaft 305. Thus, as shown in FIG. 18B, the rotational drive force of the motor 322 rotates the monitor 302 around the rotary shaft 303, and at the same time the monitor 302, which had been stowed in a longitudinal orientation, can be pivot around the pivot shaft 305 until the display screen is facing forward.

(B)

In the above embodiments, a monitor stowage device 10 was described which opened and closed the monitor 2, which was substantially square in front view, but the present disclosure is not limited to this.

For example, the shape of the monitor that is opened and closed by this monitor stowage device can instead be any of various other shapes besides substantially square, as long as there is a long-side direction and a short-side direction, such as a polygonal shape or an elliptical shape.

Also, the monitor that is opened and closed need not be just the above-mentioned LCD display panel, and may instead be some other kind of display panel.

(C)

In the above embodiments, the example that was described was a storage device for the monitor 2 installed in a portion of the ceiling 4 of a passenger compartment S in an airliner, but the present disclosure is not limited to a storage device for a monitor that is mounted in the passenger compartment of an aircraft.

For example, the present disclosure can be similarly applied to a storage device for a monitor installed in a train, a bus, an automobile (such as in the console), a ship, or some other means of transportation, or on a kitchen wall, a ceiling, a cabinet, or the like.

Alternatively, the present disclosure is not limited to a storage device of a monitor installed in a means of transportation, and can be widely applied as a device for stowing away a monitor installed on a ceiling, a wall, or any of various other installation surfaces.

Also, the installation surface where the monitor stowage device is mounted is not limited to a ceiling, and may instead be a wall or another such surface.

INDUSTRIAL APPLICABILITY

The monitor stowage device disclosed herein has the effect of allowing a monitor that is wider than the width of an attachment area to be stowed away under conditions in which the attachment area has limited width, and therefore can be widely applied to stowage devices for monitors subject to restricted dimensions in the attachment area.

The invention claimed is:

1. A monitor stowage device comprising:
    a monitor installed in a stowage component such that it can be moved between an opened state and a stowage position;
    in the opened state, the monitor has a monitor opened horizontal width and a monitor opened vertical height;
    the stowage component having a stowage component width and a stowage component length such that when the monitor is in the stowage position, the stowage component width corresponds to the monitor opened vertical height and the stowage component length corresponds to the monitor opened horizontal width;
    a motor configured to supply drive force to an opening-closing mechanism for moving the monitor between the opened state and the stowage position; and
    the opening-closing mechanism to which drive force is transmitted from the motor, moves the monitor between the opened state and the stowage position along a direction of a first plane with respect to the stowage component, and wherein
    the monitor pivots around a pivot shaft and at the same time rotates around a rotary shaft such that in the opened state:
        the monitor opened horizontal width is aligned along a second plane, the second plane being perpendicular to the first plane, and
        the monitor opened vertical height is aligned along a third plane, the third plane being perpendicular to the first plane and the second plane;
    the opening-closing mechanism has a first bevel gear, and
    the opening-closing mechanism transmits drive force to the monitor via the first bevel gear in order to pivot and rotate the monitor.

2. The monitor stowage device according to claim 1, wherein:
    the first bevel gear has a rotational axis provided along a stowage component length direction of the monitor, and which is disposed on a first end side in the stowage component length direction of the monitor, and
    the opening-closing mechanism also has a second bevel gear that is fixed and disposed on an installation surface side of the stowage component so as to mesh with the first bevel gear.

3. The monitor stowage device according to claim 2, further comprising:
    a support mechanism configured to support a second end part on the opposite side from the first end where the first and second bevel gears are provided in a monitor opened horizontal width direction of the monitor, when the monitor is opened.

4. The monitor stowage device according to claim 3, wherein:
    the motor is connected to the first bevel gear and is provided on a monitor side.

5. The monitor stowage device according to claim 3, wherein:
    the motor is connected to the second bevel gear and is provided on the stowage component side.

6. The monitor stowage device according to claim 3, wherein:
    the support mechanism has an opening formed in the stowage component along an opening direction of the monitor, and a support component that supports a second end side during opening of the monitor.

7. The monitor stowage device according to claim 6, wherein:
    the motor is connected to the first bevel gear and is provided on a monitor side.

8. The monitor stowage device according to claim 6, wherein:
    the motor is connected to the second bevel gear and is provided on the stowage component side.

9. The monitor stowage device according to claim 2, wherein:
    the motor is connected to the first bevel gear and is provided on a monitor side.

10. The monitor stowage device according to claim 2, wherein:
the motor is connected to the second bevel gear and is provided on the stowage component side.

11. The monitor stowage device according to claim 1, wherein:
the opening-closing mechanism has a rotary shaft configured to rotate the monitor in three-dimensional space, and a shaft support configured to move at an angle to the plane of the stowage component around the rotary shaft and support the monitor.

12. The monitor stowage device according to claim 1, wherein:
the rotary shaft and the pivot shaft are aligned in different directions with respect to the stowage component.

13. The monitor stowage device according to claim 12, wherein:
the rotary shaft and the pivot shaft are aligned in perpendicular direction to each other.

14. The monitor stowage device according to claim 1, wherein:
the pivot shaft is aligned parallel with respect to a display surface of the monitor.

15. The monitor stowage device according to claim 1, wherein:
the rotary shaft is aligned along an edge of the monitor.

16. A monitor stowage device comprising:
a monitor installed in a stowage component such that it can be moved between an opened state and a stowage position;
in the opened state, the monitor has a monitor opened horizontal width and a monitor opened vertical height that is shorter than the monitor opened horizontal width;
the stowage component having a stowage component width and a stowage component length such that when the monitor is in the stowage position, the stowage component width corresponds to the monitor opened vertical height and the stowage component length corresponds to the monitor opened horizontal width;
a motor configured to supply drive force to an opening-closing mechanism for moving the monitor between the opened state and the stowage position; and
the opening-closing mechanism to which drive force is transmitted from the motor, moves the monitor between the opened state and the stowage position along a direction of a first plane with respect to the stowage component, and wherein
the monitor pivots around a pivot shaft and at the same time rotates around a rotary shaft such that in the opened state:
the monitor opened horizontal width is parallel to the stowage component width;
the monitor opened horizontal width is aligned along a second plane, the second plane being perpendicular to the first plane, and
the monitor opened vertical height is aligned along a third plane, the third plane being perpendicular to the first plane and the second plane;
the opening-closing mechanism has a first bevel gear, and
the opening-closing mechanism transmits drive force to the monitor via the first bevel gear in order to pivot and rotate the monitor.

* * * * *